Nov. 17, 1970  KUNIMI YAMADA  3,540,123
MOWING MACHINE
Filed Dec. 5, 1967  2 Sheets-Sheet 1
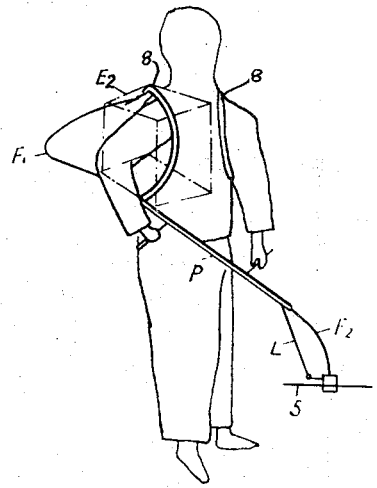
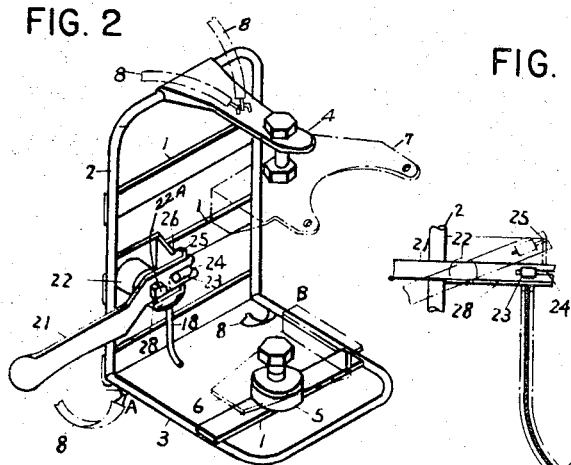
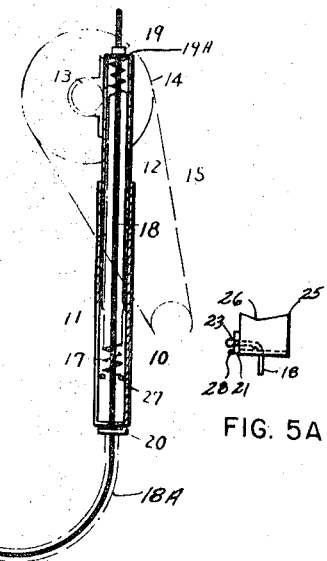
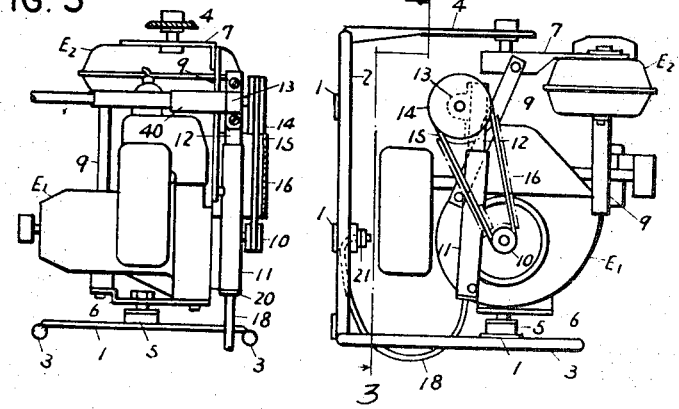
INVENTOR
Kunimi Yamada
BY
ATTORNEY

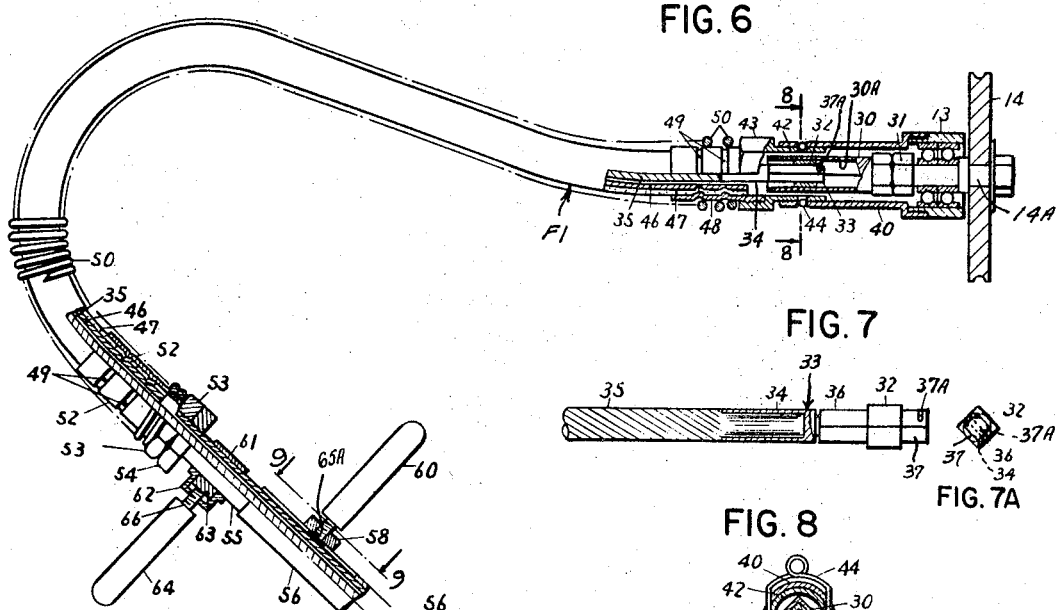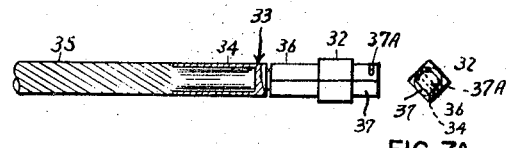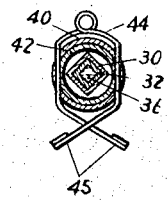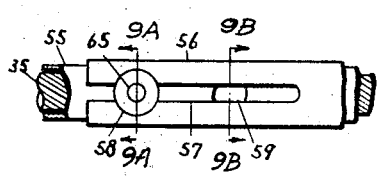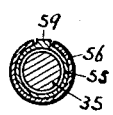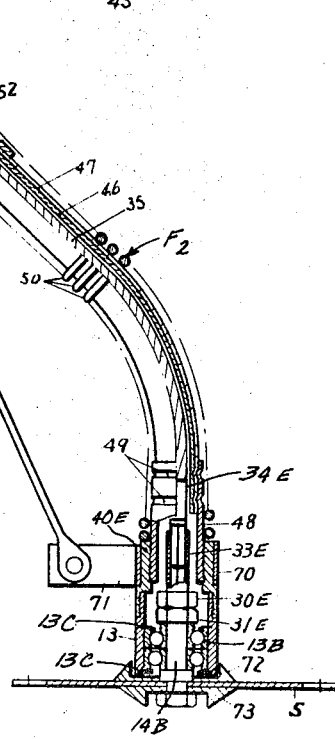

United States Patent Office 3,540,123
Patented Nov. 17, 1970

3,540,123
MOWING MACHINE
Kunimi Yamada, 1 Kuruma Aza Okunishiyama Sumaku, Kobe, Japan
Filed Dec. 5, 1967, Ser. No. 688,145
Int. Cl. B23d 45/00
U.S. Cl. 30—167                                   1 Claim

ABSTRACT OF THE DISCLOSURE

A machine of general utility particularly useful in agricultural work including a motor adapted to be carried on the back of the operator in a frame in which the motor is pivotally mounted on a vertical axis and the drive from such motor includes a belt tightener clutch mechanism which automatically releases upon overload and may be rendered inoperative by a lever carried by the frame and driven pulley of the motor drives a flexible shaft rotatably mounted in a flexible tubular casing having a rigid central section formed by a rigid pipe and the free end of the flexible cable drives a rotary disc cutter, the position of which is controlled by an outer pipe telescopically mounted on the central pipe section and connected by a link to the bearing support for the rotatable disc cutter, so that the user can position the disc cutter in any desired location to cut growing crops and trim bushes and trees and for many other purposes.

The present invention relates to a machine adaptable to mow growing crops and for trimming trees and the like by the use of motive power carried on the back of the workman, using a flexible shaft connection and an overload control to drive a disc cutter which can be accurately positioned by the workman.

Heretofore various types of power operated equipment have been provided including that shown in Pat. No. 3,219,129 which discloses a motor carried on the back of a workman with a flexible drive shaft extending from the motor and carrying a disc cutter. Although the prior devices have worked satisfactorily, they have not provided for overload control nor have they provided for ease of replacement of the flexible cable and the weight of the prior machines has been excessive.

Accordingly, it is an object of the present invention to provide equipment which overcomes the difficulties experienced with the prior art structures.

Another object is to provide a flexible cable of light weight which can be readily serviced and will have a long useful life.

Another object is to provide a motor overload clutch mechanism which prevents overloading of the motor and reduces danger of injury to persons and damage to property.

Other and further objects will be apparent as a description proceeds and upon reference to the accompanying drawings, wherein:

FIG. 1 is a perspective of the mowing machine of the present invention carried on the back of a person and diagrammatically showing the major parts thereof.

FIG. 2 is a perspective of the motor carrying frame with the engine removed and showing the clutch control lever and in phantom showing the engine mounting supports pivotally mounted on the frame.

FIG. 3 is a section through the frame looking rearwardly and showing the engine pivotally mounted.

FIG. 4 is a side elevation of the motor and frame.

FIG. 5 is a diagrammatic illustration of the automatic overload clutch control for the driving belt with parts omitted.

FIG. 5A is a fragmentary detail of the clutch control lever and the Bowden wire connection.

FIG. 6 is an elevation with parts in full section and other parts in quarter section of the flexible drive cable and the flexible tubular ends mounted on the solid tubular central section showing the connection to the driven pulley and the connection to the cutting disc and the means to position the cutting disc in desired positions.

FIG. 7 is an enlarged detail of the driving connection at the end of the flexible cable.

FIG. 7A is an end view thereof.

FIG. 8 is a section taken on line 8—8 of FIG. 6 showing the detachable connection of the flexible cable with the driving pulley.

FIG. 9 is a fragmentary view taken on line 9—9 of FIG. 6 showing the means to retain the slidable tube for rectilinear movement and fixed positioning on the central tubular section of the flexible shaft.

FIG. 9A is a fragmentary detail taken on section line 9A—9A of FIG. 9 showing the means to clamp the slidable tube in fixed position.

FIG. 9B is a section taken on line 9B—9B of FIG. 9 showing the lug in the slot of the outer tube for preventing relative rotary movement.

A frame includes a vertical U-section and a horizontal U-section formed by bending pipes and extending between the legs of the U-sections are cross pieces 1 while a strut 4 projects from the bight portion of the vertical frame to overlie the cross brace 1 of the horizontal frame which carries a thrust bearing 5 and a mounting pivot which rotatably supports a lower mounting plate 6 which cooperates with an upper mounting plate 7 rotatably mounted on a stud extending downwardly from strut 4 to support an engine including a motor $E_1$ and a gasoline tank $E_2$ connected together and to mounting plate 7 by a plurality of struts 9 thereby effectively supporting the engine on the mounting frame so that the mounting frame can be supported on a workman by means of shoulder straps 8, 8 suitably connected to the frame.

It will be apparent that the engine and fuel tank $E^1$ and $E_2$ are suitably bolted to the upper and lower mounting plates 6 and 7 so that they may freely rotate and minimize the bending of the flexible cable drive.

The motor has a drive pulley 10 which drives a belt 15 and a driven pulley 14 rotatably mounted in a bearing 13 fixedly supported on a telescoping tube 12 which is slidably mounted in a tube 11 fixed to the engine $E_1$ with the tube 12 being urged to its extended position by a spring 17 reacting between bolts 27 extending through the tube 11 and a plate 19A fixed to the upper end of tube 12, a flexible wire 18 passing through the tube and through the spring with a flexible sheath 18A extending from the bottom end of tube 11 to a stop plate 28 carried by cross member 1 of the vertical frame. The tubular flexible sheath 18A is suitably fixed to the tube 11 so the flexible wire 18 may control the movement of the upper tube 12 in the manner of a Bowden wire, a stop 20 being provided on a wire 18 to limit the downward movement of the tube 12 and pulley 14 to maintain the belt in operative relation.

A control lever is pivotally mounted by means of a headed stud 22A passing through an enlarged opening in the lever 21 and through a spacer 22 and secured to one leg of an angle bracket and the cross member 1 to provide for pivotal movement of the lever 21 about the stud and also pivotal movement transverse to the stud 22A. The flexible wire 18 is connected to the lever 21 by means of a detent enlargement 23 passing through a slot 24 and providing for positive movement of the wire 18 as the lever is rotated, the other leg 25 of the angle bracket being provided with a V notch 26 to receive the end of the lever 21 which includes the detent 23 and the wire 18 as shown in phantom lines in FIG. 5 to provide tension on the flexible wire 18 and move the pulley 14 downwardly thereby loosening the belt 15 and stopping the pulley 14. The angle bracket including leg 25 may also include the plate 28 in the manner of three sides of a box and it will be evident that the detent 23 and the wire 18 are sufficiently stiff to maintain angular relation shown in FIG. 5A to effectively tension the wire to produce the necessary clutching and unclutching action by the drive belt 15, the horizontal section of the wire 18 being adapted to slide in the slot 24 to provide for accurate free control by the lever 21.

Telescoping tubes 11 and 12 are keyed together to prevent relative rotation so that the axis of pulley 14 is maintained parallel to the axis of drive pulley 10 and this may be accomplished by the use of square tubes, for example. A lug 19 on the wire 18 engages the plate 19A fixed to upper end of tube 12 to cooperate with the flexible wire 18 to move the pulley 14 downwardly and thereby disengage the driving connection.

The pulley 14 is fixed to shaft 14A rotatably mounted in ball bearings held in position in the tubular bearing sleeve 13 by suitable rings extending into grooves in the tubular casing 13, a coupling 30 having a circular exterior and a square interior is provided with a threaded axial aperture which is threaded onto the threaded end of shaft 14A and is held in position by a lock nut 31 and such coupling 30 receives an accurately fitted case piece 32 having a square exterior and a square interior forming a type of collar which receives the square end 36 of a coupling member 33 which has a cylindrical tubular portion 34 which receives a compressed end of the flexible driving cable 35 so that the exterior of the coupling 33 has no larger diametrical dimension than the cable 35 to permit sliding insertion and removal of the flexible cable 35 through the flexible tubular housing $F_1$ and $F_2$ at each end of a central rigid tubular section 55 to provide for easy assembly and replacement when necessary. The connection of the end of flexible cable 35 to the tubular section 34 is accomplished by compressing the cable end so that the pressed end is diminished by about ½ a millimeter and is fitted into the cylindrical tubular base 34 whose outer diameter is the same as that of the cable or wire rope 35 and the joint is made secure by the use of solder or similar material and a relatively low heat to prevent damage or deterioration of the twisted steel wire in the flexible wire rope cable 35.

The FIG. 7A end view clearly shows that the coupling 33 with base 34 and flat surfaces 37 forming a square end 36 lie within a space defined by the periphery of the base 34 and the flexible cable 35. The case piece 32 is kept from slipping off the square end 36 by a removable pin 37A passing through the end portion of square end 36 so the ends of the pin project to engage the end of case piece 32 which case piece 32 is confined between such pin 37A and the round base 34 and thereby the square end 36 of coupling 33 is slidable in the square socket 30A of the coupling 30 connected to shaft 14A. The other end of the flexible cable has the square end 36E directly slidable in socket 30 which permits ready replacement of the flexible cable shaft by disassembly of housing 40 from tubular extension 42 and removal of the flexible cable shaft through the end $F_1$ of the flexible shaft housing.

As explained above the bearing housing 13 is fixed to the telescoping tube 12 and a coupling casing 40 is screw threaded onto a portion of the bearing housing 13 to house the coupling 30 while permitting assembly and disassembly by removal of the casing 40. A nut 43 with a tubular extension 42 is adapted to have the tubular extension telescope into the casing 40 and is retained therein by a clasp 44 which surrounds the casing 40 cooperating with registering slots on opposite sides of the casing 40 and on the nut extension 42 to retain the parts in assembled relation, the clasp 44 having a pair of parallel leg portions which are received in the slots and the clasp also having handle portions 45 by means of which the legs of the clasp may be separated to permit separation of the nut 43 with its tubular extension 42 from the casing 40 and also providing for positive connection when the clasp is in position and the parts are in registry.

The flexible metallic tube 46 of conventional design is covered with a plastic covering 47 of rubber-like material and the end thereof is fixedly secured to a short pipe section 48 which has pressed ridges formed on the inner surface against the flexible tube 46 and the covering 47 to thereby maintain the flexible tube in fixed position, the end of the pipe section 48 being threadedly received in the nut portion 43 thereby providing for the positive connection to the bearing 13 and providing for the driving connection to the pulley 14.

Surrounding the flexible tube $F_1$ and the flexible tube $F_2$ are coiled springs 50, 50 which reinforce the flexible tube and prevent kinking thereof and the coils of such spring overlap the pipe section 48 and also overlap a pipe section 52 which is secured to the other end of the flexible tube by ribs formed on the inner periphery by pressure which forms grooves on the outer periphery at 49, the pipe section 52 also includes a nut portion 53 which is threaded onto a rigid central pipe section 55 and is locked in position thereon by a locking nut 54. It will also be noted that the flexible tubular section $F_2$ is a substantial duplicate of the section $F_1$ with similar parts having similar reference numerals.

Telescopically mounted on the rigid central pipe section 55 is a shorter pipe section 56 having a slot 57 formed in one end which embraces a lug 59 fixed to or integral with the pipe 55 to prevent relative rotation of pipe section 56 with respect to pipe section 55 but the pipe section 56 may move longitudinally by means of a handle 60 threaded into a boss 58 which is fixed to opposite portions of the pipe section 56 on opposite sides of the slot 57. A handle 60 having a screw threaded shank 65 is screw threaded in a cooperating threaded aperture in the boss 58 and is adapted to press against a shoe 65A freely rotatable on the reduced end of threaded shank 65 which presses against the tube section 55 upon rotary clamping movement of handle 60 to thereby retain the outer tube section 56 in any adjusted position with the handle 60 providing for the relative movement between the pipe sections.

A collar 61 surrounds the pipe section 55 and has a hollow boss 62 carrying a shoe 63 movable radially therein. A handle 64 having a threaded shank 66 threaded into the closed end of the hollow boss 62 presses against the shoe 63 to thereby produce a clamping action between the shoe 63 and the opposite portion of the collar 61 so that the handle 64 may be adjusted into any angular position with respect to the rigid pipe section 55.

The flexible cable drive section $F_2$ has its parts similarly identified where the parts are identical. The tubular pipe portion 48 is secured to the flexible tube and has its exteriorly threaded end threaded into housing 40E which in turn is threaded onto the bearing housing 13A which receives the anti-friction bearings 13B which are held in place by snap rings 13C at each end in a well known manner by extending into grooves on the inner periphery of the bearing housing 13A. A collar 70 having an arm 71 is secured to the housing 40E by any suitable means including clamp screws so that the collar may be fixed in a desired angular position. A link L is pivotally connected to the arm 71 and to a lug 71A on the lower end of the outer telescoping pipe section 56 so that longitudinal movement of the pipe section 56 will cause movement of the link and thereby cause angular change in the position of the saw-carrying shaft 14B while the handle 64 provides for angular movement about the axis of pipe 55 of the flexible section $F_2$ as well as the saw S so that with suitable adjustments the disc cutter S can be adjusted to any angular position as desired by the workman.

The disc carrying shaft 14B is suitably connected to the sleeve coupling member 30E which has a square cross section passage for receiving the square cross section male end 33E of the flexible cable 35 and the coupling member 30E may be detachably connected to the shaft 14B and held in adjusted position by the lock nut 31E in a manner similar to that described with respect to the connection adjacent the pulley 14. In use the lever 21 is first moved downwardly to the dotted line position of FIG. 5 and the slotted end received in the notch 26 thereby loosening the belt 15 by movement of the pulley 14 downwardly with the tube 12 as the lug 19 engages the plate 19A abutting the end of the pipe 12. The engine is then started in the usual manner and the operator supports the machine on his back by means of the shoulder straps 8 as shown in FIG. 1 at which time the operator engages the handles 60 and 64 with his hands suitably fixing the handles in the desired position so that one hand can hold the flexible cable with the cutting disc S in a position so that no damage or injury can occur and the operator then reaches around with his left hand and changes the position of lever 21 to the full line position of FIG. 5 to thereby cause the spring 17 to extend the pipe 12 and thereby tighten the belt 15 causing driving rotation of pulley 14, shaft 14A and through suitable couplings the flexible cable shaft 35 which through suitable couplings rotates shaft 14B causing rotation of the cutter disc S which is held in clamp position by pad pieces 73 and 72 clamped on the opposite surfaces of the disc cutter S and held in position by a nut in the usual manner, suitable keying being provided.

The operator can then control the position of the cutter disc S by suitable manipulation of the handles 60 and 64, the handle 60 serving to move the outer pipe section 56 and thereby the link L adjusting the angle of the cutter S, the lug 59 preventing relative rotation between the pipe sections 55 and 56 thereby preventing twisting of the flexible section $F_2$.

The driving flexible cable shaft 35 with its ends 33 will vary in length due to twisting when a load is applied, however, the case pieces 32 on end 36 can slide within the square socket 30A since the square socket 30A is large enough to telescopically receive the circular exterior of the base 34 of coupling 33 and the wire of cable shaft 35 since the distance between the outside flat surfaces of case piece 32 is greater than the diameter of the base 34 and the cable shaft 35 and the telescopic sliding movement in the couplings 30 and 30E thereby accommodate for lengthening and shortening of the cable due to twisting or due to heating. Also this provides for removal and replacement of the cable shaft 35 without complications since no part of such shaft or any part of the couplings fixed thereto have a diametrical dimension greater than the diameter of the cable shaft 35.

In the event the disc cutter S strikes an obstruction such as a stone or is overloaded due to any other causes, the pulley 14 must therefore have a greater torque to rotate, but as soon as the torque required to rotate the pulley 14 becomes excessive the belt 15 pulls the pulley 14 toward the pulley 10 by compressing the compression spring 17 thereby causing the bearing housing 13 to move toward the pulley 10 resulting in reduced tension on the belt 15 causing the belt to slip on the pulleys 10 or 14.

From the above description it will be apparent that the two meter long flexible drive shaft with its tubular housing has a central rigid pipe section of the same internal diameter as the end flexible tubular housings $F_1$ and $F_2$, thereby substantially reducing the weight of the flexible drive arrangement without reducing the strength thereof and the end connections being of no greater diameter than the flexible cable shaft provides for easy assembly and replacement. Further, the clearance between the flexible shaft and the tubular flexible housing can be kept to a minimum and the squared ends which extend into the couplings prevents longitudinal stress on the flexible shaft since the ends are free to telescope in the coupling, thereby preventing excessive pressure between the flexible cable shaft in tubular housing. The flexible drive ends $F_1$ and $F_2$ are approximately 70 and 30 centimeters long while the central pipe section 31 is approximately 1 meter long. The outer telescoping pipe 56 and the link L are pivoted together and the link L is pivoted to the strut 71 in such a manner that the axes of the pivots remain parallel to thereby prevent relative rotation of part of the flexible drive $F_2$ while permitting accurate angular positioning of the cutting disc S so that such cutting disc can extend at right angles to the pipe 55 or at various acute angles such as that shown in FIGS. 1 and 6.

Changes may be made within the spirit of the invention as defined by the valid scope of the claim.

What is claimed is:

1. An automatic overload protection drive and clutch structure comprising a motor having a drive pulley, a member fixedly mounted on said motor, a member movably mounted on said fixed member for movement toward and away from said driving pulley, a driven pulley and shaft rotatably mounted on said movable member and a belt connecting said driven pulley from said drive pulley, and resilient means urging said movable member in a direction to tighten the belt, a control means and flexible connection means between said movable member and said control means for moving said movable member in a direction out of driving relation, means to retain the control means in a position to prevent driving of said driven pulley, a light weight flexible shaft construction of general utility comprising a tubular casing having flexible sections, a flexible drive cable shaft rotatably mounted in said tubular casing and having a non-circular connection at each end with the maximum diameter of said non-circular driving connection being not greater than the diameter of said flexible drive cable shaft whereby said flexible drive cable shaft may be inserted without removal of the driving connection, one end of the flexible drive cable connected to said driven pulley and a disk cutter connected to the other end of said flexible driven cable.

References Cited

UNITED STATES PATENTS

| 2,697,457 | 12/1954 | Lawrence | 30—276 X |
| 3,219,129 | 11/1965 | Yamada | 173—30 |
| 3,269,010 | 8/1966 | Bettcher | 30—276 |
| 3,346,955 | 10/1967 | Beneke | 30—276 |

ROBERT C. RIORDON, Primary Examiner

J. C. PETERS, Assistant Examiner

U.S. Cl. X.R.

30—276, 296; 173—30